US012686398B2

(12) United States Patent
Deborne et al.

(10) Patent No.: US 12,686,398 B2
(45) Date of Patent: Jul. 21, 2026

(54) MOTOR VEHICLE DRIVING ASSISTANCE MODULE AND METHOD

(71) Applicant: AMPERE S.A.S., Boulogne Billancourt (FR)

(72) Inventors: Renaud Deborne, Guyancourt cedex (FR); Raphael Quilliard, Guyancourt cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 62 days.

(21) Appl. No.: 18/708,445

(22) PCT Filed: Nov. 3, 2022

(86) PCT No.: PCT/EP2022/080690
§ 371 (c)(1),
(2) Date: May 8, 2024

(87) PCT Pub. No.: WO2023/083693
PCT Pub. Date: May 19, 2023

(65) Prior Publication Data
US 2025/0026359 A1    Jan. 23, 2025

(30) Foreign Application Priority Data

Nov. 10, 2021    (FR) ...................................... 2111940

(51) Int. Cl.
*B60W 50/04* (2006.01)
*B60W 30/095* (2012.01)
(Continued)

(52) U.S. Cl.
CPC ...... *B60W 50/045* (2013.01); *B60W 30/0956* (2013.01); *B60W 50/0205* (2013.01); *B60W 50/14* (2013.01)

(58) Field of Classification Search
CPC ........... B60W 50/045; B60W 30/0956; B60W 50/0205; B60W 50/14
See application file for complete search history.

(56) References Cited

U.S. PATENT DOCUMENTS 5,142,612 A * 8/1992 Skeirik .................... G06N 3/08
706/23
2021/0132940 A1 5/2021 Poledna

FOREIGN PATENT DOCUMENTS

DE   10 2018 130 815 A1   6/2020
EP   3 816 741 A1   5/2021
(Continued)

OTHER PUBLICATIONS

English Machine Translation EP-3661827-B1 (Year: 2020).*
(Continued)

*Primary Examiner* — Andrew J Cromer
(74) *Attorney, Agent, or Firm* — Oblon, McClelland, Maier & Neustadt, L.L.P.

(57) ABSTRACT

A driving assistance module for a motor vehicle includes a main block that receives, at input, a set of input data relating to the motor vehicle and to its environment, and that provides, at output, a preliminary control for the motor vehicle on the basis of the input data, and a safeguarding block for safeguarding the preliminary control setpoint, which safeguarding block is separate from the main block and receives, at input, the preliminary control setpoint and a set of check data, provides, at output, a final control setpoint and checks that the preliminary control setpoint is in accordance with a set of at least one predefined rule. The set of check data differs from the set of input data, and each of the check data has a safety level strictly higher than a safety level of at least one of the input data.

10 Claims, 3 Drawing Sheets

(51) Int. Cl.
    *B60W 50/02*      (2012.01)
    *B60W 50/14*      (2020.01)

(56)              References Cited

FOREIGN PATENT DOCUMENTS

| EP | 3661827 B1 * | 3/2025 | ............ | B60W 50/14 |
|----|--------------|--------|--------------|------------|
| WO | WO 2019/025333 A1 | 2/2019 | | |

OTHER PUBLICATIONS

International Search Report mailed on Jan. 5, 2023 in PCT/EP2022/
080690 filed on Nov. 3, 2022 (2 pages).
Preliminary French Search Report dated Jun. 22, 2022 in French
Application 2111940 filed on Nov. 11, 2021 (3 pages, with Trans-
lation of Categories).

\* cited by examiner

MOTOR VEHICLE DRIVING ASSISTANCE MODULE AND METHOD

TECHNICAL FIELD OF THE INVENTION

The present invention relates in general to safety in the motor vehicle sector.

It relates more particularly to a driving assistance module and to a driving assistance method for a motor vehicle.

The invention is applied to particular advantage in the design of safe software for automating the driving of motor vehicles.

PRIOR ART

Modern motor vehicles comprise a plurality of computers that offer a large number of functions, including functions for the autonomous or semi-autonomous control of the vehicle.

Among these functions, mention may for example be made of the function for automatically keeping the vehicle in the center of its traffic lane, or the adaptive cruise control function (which makes it possible to keep the speed of the vehicle at a setpoint speed or to adjust this speed if traffic is dense in order to maintain appropriate safety distances).

These functions implement a significant amount of software, generally representing several million lines of code.

Some of these functions are critical for the safety of the vehicle. Therefore, the software has to be developed in accordance with strict design rules that are defined for example by the ISO 26262 standard. The computer hardware and the sensors are also selected based on this standard.

This ISO 26262 standard defines levels of requirements in terms of motor vehicle safety ranging from level ASIL-A (least critical level) to level ASIL-D (most critical level).

When designing the vehicle, provision is made to develop each function while complying with the ASIL level that is assigned thereto.

Naturally, the more critical the function, the higher the ASIL level, and the more expensive the development of the software turns out to be, in particular in terms of development time.

In order to be able to deploy a function on vehicles when the software has not yet been certified with the desired ASIL level (and it is therefore considered still to be in the development phase), document EP3816741 proposes a method for checking the output from the software in the development phase.

In practice, this document teaches to send the output from the software in the development phase to a safety monitor that itself meets a certain safety level.

This monitor will therefore read the output and carry out tests thereon in order to check that it is safe and that it is able to be employed in its current state. These tests consist for example in checking that the output will not lead to a collision, to instability of the vehicle, to a comfort problem, to excess acceleration of the vehicle, etc.

If the output passes the tests, it is transmitted to the actuators. If it does not, it is not transmitted.

The drawback of this solution is that it does not guarantee a safety level that is sufficient to be deployed on series vehicles. On the contrary, it only makes it possible to carry out tests on pre-series vehicles.

PRESENTATION OF THE INVENTION

In order to rectify the abovementioned drawback of the prior art, the present invention proposes to assign the burden of complying with the selected ASIL level to a specific software entity that will, on its own, make it possible to check that the computed control setpoint actually complies with selected functionalities.

More specifically, what is proposed according to the invention is a driving assistance module for a motor vehicle, comprising:

a main block (or "software component") that receives, at input, a set of input data relating to the motor vehicle and to its environment, and that provides, at output, a preliminary control setpoint for the motor vehicle on the basis of the input data, and a safeguarding block (or "software component") for safeguarding the preliminary control setpoint, which safeguarding block is separate from the main block and receives, at input, the preliminary control setpoint and a set of check data, provides, at output, a final control setpoint and checks that the preliminary control setpoint is in accordance with a set of at least one predefined rule (also called "functionalities"), wherein the set of check data differs from the set of input data, and wherein each of the check data has a safety level strictly higher than a safety level of at least one of the input data.

Thus, by virtue of the invention, the safeguarding block, using the check data the safety level of which is deemed to be sufficient, is able to check that the preliminary control setpoint is or is not able to be used.

In other words, the safeguarding block is able, very reliably, to check that the preliminary control setpoint satisfies predefined rules using these check data.

The proposed solution is therefore generic and is therefore able to be used in various motor vehicle sectors.

It is inexpensive in the sense that the main block does not have to be certified to the desired safety level; only the safeguarding block has to be. However, this safeguarding block is small enough to be able to be developed without requiring a significant development time. The safeguarding block thus makes it possible to reduce the function development time, and may then be applied to the final vehicle (that is to say housed on board this vehicle).

This solution thus makes it possible to ensure that, in 100% of conceivable scenarios, the final control setpoint will be able to be used without a risk to the motor vehicle.

Other advantageous and non-limiting features of the invention, taken individually or in any technically feasible combination, are as follows:

the final control setpoint depends on the preliminary control setpoint;

the final control setpoint is equal to the preliminary control setpoint when the preliminary control setpoint is in accordance with the predefined rules and, if not, is equal to a predetermined safety setpoint;

the safeguarding block is designed to compute an intermediate control setpoint and the final control setpoint is equal to the maximum out of the preliminary control setpoint and the intermediate control setpoint;

when, at a first time, the preliminary control setpoint is no longer in accordance with the predefined rules, each component of the final control setpoint varies discontinuously;

when, at a subsequent second time, the preliminary control setpoint is in accordance with the predefined rules again, at least one component of the final control setpoint varies continuously;

the check data all have a determined ASIL safety level;

at most one of the check data has a safety level lower than that of the other check data;

the final control setpoint comprises a torque to be transmitted to an actuator of a drivetrain or of a braking system so as to carry out a function of automatically adjusting the speed of the motor vehicle;

the final control setpoint comprises a warning signal for activating a human-machine interface when the driver of the motor vehicle is no longer focusing on their driving and when a function of keeping the motor vehicle in the center of its traffic lane is activated;

the safeguarding module is designed to count the time that has elapsed for which the driver of the motor vehicle has no longer been focusing on their driving, in the form of a whole number of cycles.

The invention also relates to a method for computing a final control setpoint for a motor vehicle equipment, comprising:

a main block receiving a set of input data relating to the motor vehicle and to its environment, the main block computing a preliminary control setpoint on the basis of the input data, a safeguarding block, separate from the main block, receiving the preliminary control setpoint and a set of check data, computing the final control setpoint, which comprises checking that the preliminary control setpoint is in accordance with a set of at least one predefined rule, wherein the set of check data differs from the set of input data, and wherein each of the check data has a safety level strictly higher than a safety level of at least one of the input data.

The invention also relates to a method for designing a module, wherein, with the module being programmed to implement an autonomous driving function for the motor vehicle, provision is made for the following steps:

dividing the function into at least two separate functionalities, at least one of which has to have a safety level higher than that of at least one other functionality, programming software for implementing said function, in at least two blocks including a safeguarding block that is designed to implement the functionality having the higher safety level, said first block receiving the check data at input, and the other block receiving the input data at input, checking the results provided by the software using multiple scenarios.

Of course, the various features, variants and embodiments of the invention may be combined with one another in various combinations provided that these are not incompatible or mutually exclusive.

DETAILED DESCRIPTION OF THE INVENTION

The following description with reference to the appended drawings, which are given by way of non-limiting example, will give a good understanding of the content of the invention and how it may be implemented.

Figure 1:
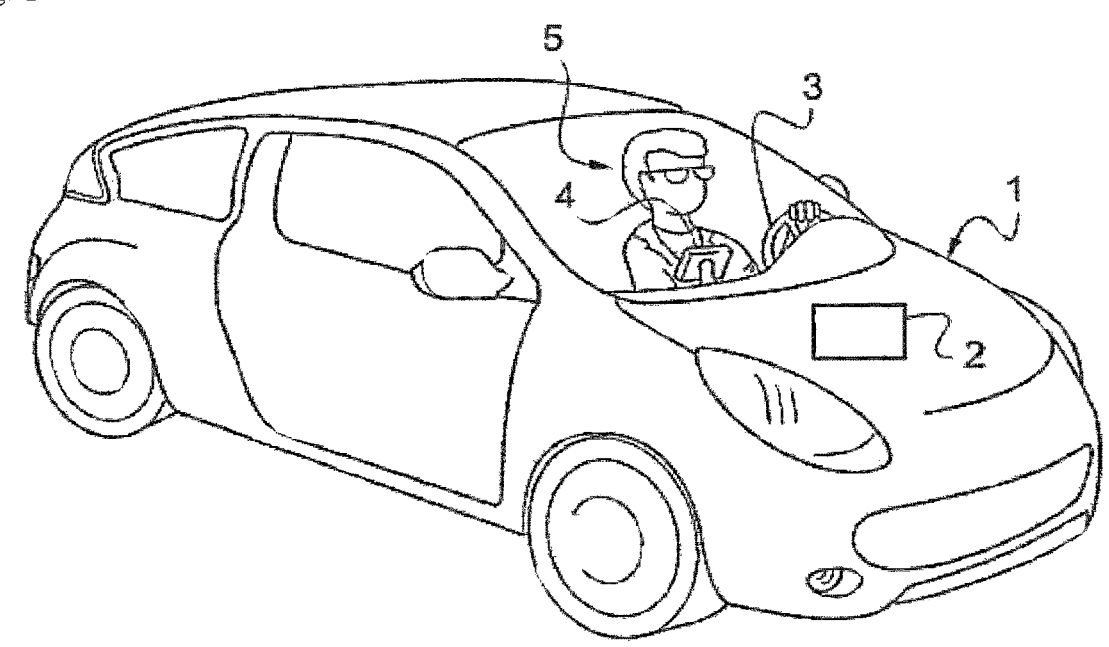
FIG. 1 is a schematic perspective view of a motor vehicle according to the invention.
Figure 4:
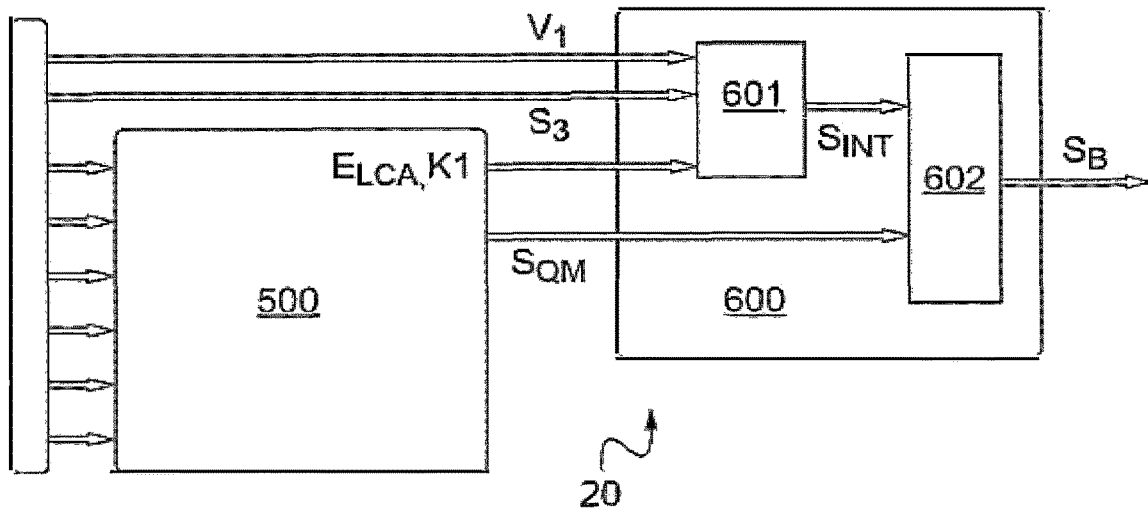
FIG. 4 is a schematic block view of software for automatically keeping the motor vehicle from FIG. 1 in the center of its traffic lane.
Figure 5:
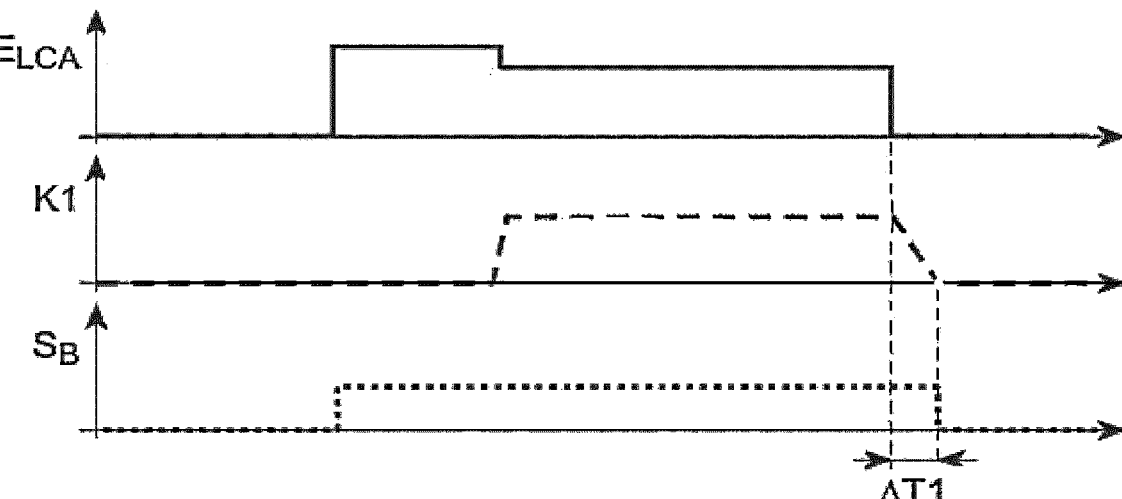
Figure 6:
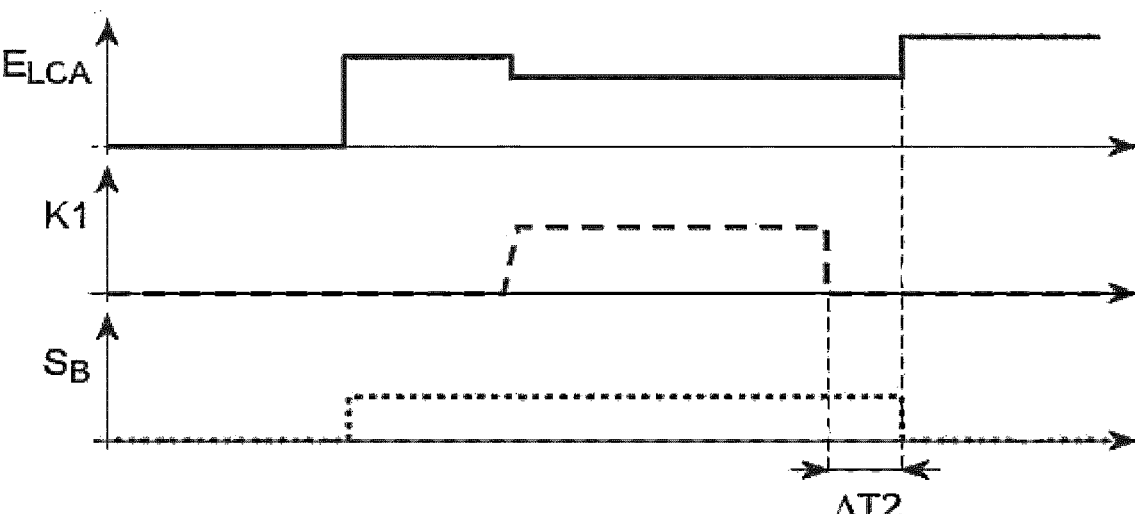
Figure 7:
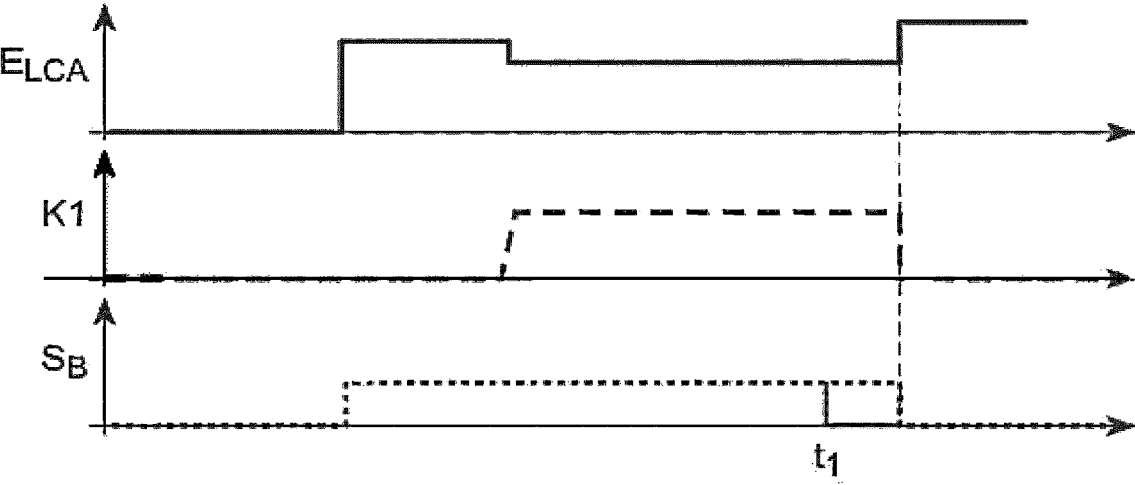

FIG. 5 is a graph illustrating, in synchronized form, the variations over time of three parameters of the motor vehicle from FIG. 1 equipped with the automatic lane keeping software from FIG. 4, during a phase of deactivating the automatic lane keeping function, FIG. 6 is a graph illustrating, in synchronized form, the variations over time of three parameters, during a phase in which one of the inputs of the software is corrupted, FIG. 7 is a graph illustrating, in synchronized form, the variations over time of three parameters, during a phase in which the other of the inputs of the software is corrupted.

VEHICLE

[FIG. 1] shows a motor vehicle 1 designed to implement the invention.

In this case, said motor vehicle is a car. As a variant, it could be another type of vehicle (truck, motorcycle, bus, etc.).

In this case, this vehicle 1 comprises, as is conventional, a passenger compartment containing in particular a seat for the driver 5 of the vehicle, a dashboard and a steering wheel 12.

This vehicle 1 comprises a drivetrain, a braking system and a steering system for steering the vehicle (these not being visible in the figure). As is conventional, the steering system comprises an electronically controllable power steering actuator, the drivetrain comprises an electronically controllable engine control actuator, and the braking system comprises an electronically controllable braking actuator.

This vehicle 1 is furthermore equipped with at least one human-machine interface. In practice, the dashboard integrates a display screen 4 and at least one loudspeaker (not visible).

The vehicle 1 also comprises an electronic processing unit 2 that comprises a plurality of computers (microprocessors or microcontrollers), memories and input and output interfaces.

By virtue of its input interfaces, the electronic processing unit 2 is able to receive various input data that originate from third-party sensors or computers. These input data relate to the motor vehicle (speed, etc.), to its internal environment (position of the driver, etc.) and to its external environment (position on the road, etc.).

It is in particular designed to receive:

a datum relating to whether or not the driver is holding the steering wheel 3, images of the environment, for example acquired by cameras oriented ahead of the vehicle, and the speed $V_1$ of the vehicle 1 (measured for example by a sensor located on a wheel axle of the vehicle).

By virtue of its output interfaces, the electronic processing unit 2 is able to control the human-machine interface so as to provide the driver with information. It is also able to control the power steering actuator, the engine control actuator and the braking actuator.

By virtue of its memories, the electronic processing unit 2 stores a computer application consisting of computer programs (or "software") comprising instructions the execution of which by the computers allows the method described below to be implemented.

In the remainder of this disclosure, it will be considered that each piece of "software" makes it possible to implement a particular driving assistance "function" for the vehicle.

In this case, more particular consideration will be given to two pieces of software for executing two separate autonomous control functions for the vehicle (and in particular path monitoring).

One of these functions is that of automatically adjusting the speed of the vehicle, referred to as ACC (adaptive cruise control) function.

The other of these functions is that of keeping the vehicle in the center of its lane, referred to as LCA (lane centering assist) function.

These two functions will be defined in more detail in the remainder of this disclosure.

At this stage, it may be noted that each piece of software will have to be characterized by a safety level.

This safety level makes it possible, on the basis of a risk analysis, to determine the extent to which the software is able to implement the function in complete safety.

The "safety level" under consideration will in this case be established in accordance with the ISO 26262 standard. Reference will then be made hereinafter to an ASIL (Automotive Safety Integrity Level") level.

A piece of software having a guaranteed safety level may thus be classified into four levels, from the bottom level ASIL-A to the top level ASIL-D (level offering the highest safety), passing through levels ASIL-B and ASIL-C in that order.

By contrast, a piece of software that does not meet any particular safety level will have a classification "QM".

It will then be said, for a first piece of software, that it has an ASIL level higher than another if its ASIL level is classified at a level higher than that of this other piece of software or if this other piece of software is classified as "QM".

It will also be noted that data may be certified by a safety level. This safety level will in this case also be defined by the abovementioned standard. Thus, hereinafter, a datum may be characterized by its ASIL level.

Context of the Invention

The invention proposes to simplify the design and development of driving assistance software for motor vehicles, while still ensuring for it an ASIL level in accordance with specifications.

For this purpose, it is proposed, in the software for executing the intended driving assistance function, to isolate one or more functionalities that effectively need to be developed with the required ASIL level.

Therefore, the software implementing the driving assistance function is divided into two separate software components, including a "safety component" that is fully coded so as to exhibit the required ASIL level and another component that is coded with a lower ASIL level (or even one classified as QM) and that is able to create a setpoint for the autonomous driving of the vehicle.

The safety component is preferably defined such that its inputs all meet the required ASIL level.

However, it may be the case that only some of these inputs do not meet this safety level. In this case, provision is made to consolidate this input, that is to say to make it more reliable and more robust, using another input (the safety level of which may or may not be at the required ASIL level). For this purpose, it is possible to use mechanisms for limiting impacts on the ASIL level. Such a mechanism may consist of a risk of error detection means, an open-loop or closed-loop control system, etc.

Preferably, the safety component is coded so as to execute only the functionalities that actually need to be developed with the required ASIL safety level. All other functionalities are then located in the other component. Indeed, the safety component needs to be checked precisely in order to be certified with the desired ASIL level, meaning that, the smaller its size, the easier it will be to certify.

Once the software components have been defined, provision is made to create certification scenarios at the desired ASIL level for the entire driving assistance function. These scenarios are preferably developed to validate this ASIL level in extreme cases, so as to reduce the number of scenarios to be contemplated.

It is thus possible to find out the coverage of the chosen model, that is to say the percentage of validated scenarios. The objective is for all scenarios to be validated, so that all functionalities are guaranteed.

ACC Function

A first exemplary application of the invention may be focused on.

In this first example, the function in question is the ACC function for automatically adjusting the speed of the vehicle.

By virtue of this function, the driver is able to select a speed setpoint. This may be for example a particular speed (such as 80 km/h), or a request telling the vehicle to drive, if possible, at the maximum permitted speed of the traffic lane being driven in. On the basis of this speed setpoint and of the data from sensors housed on board the vehicle, the ACC function makes it possible to compute control setpoints for the engine control actuator and for the braking actuator. These setpoints are computed so as to adjust the speed of the vehicle either to the speed setpoint, as long as no third-party vehicle gets too close to the vehicle 1, or to a reduced speed that depends on the speed of the third-party vehicle in front of it, so as to maintain an acceptable safety distance therefrom.

Such an ACC function is implemented using, at input, data relating to the motor vehicle 1 and to its environment (speed, speed setpoint, distance to the vehicle ahead, speed of the vehicle ahead, etc.), and it makes it possible to provide, at output, at least one control setpoint to be transmitted to the actuators.

This function is coded in a module (hereinafter called ACC software 10) and is executed in hardware terms by a single computer, although, as a variant, a plurality of computers could be used.

Since this ACC software 10 ensures compliance with safety objectives, it has to be certified to a particular ASIL level, in this case level ASIL-B.

Figure 2:
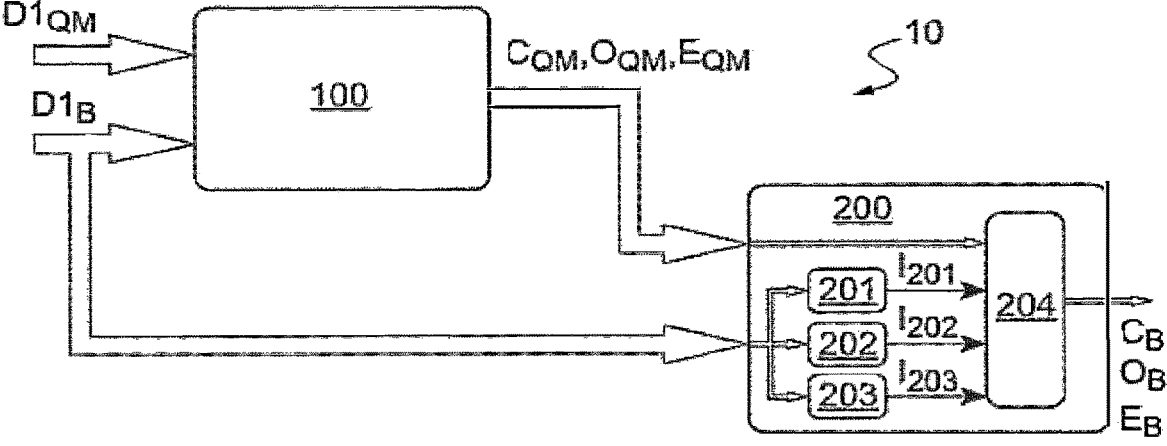
FIG. 2 is a schematic block view of automatic speed adjustment software installed in the memory of the motor vehicle from FIG. 1.

As shown by [FIG. 2], it receives input data $D1_B$, $D1_{QM}$ relating to the vehicle and to its environment, which input data are of two types. The input data $D1_B$ of the first type have a safety level ASIL-B, while the input data $D1_{QM}$ of the second type have a lower safety level (ASIL-A or QM).

It provides, at output, a control setpoint that has to meet safety level ASIL-B.

This control setpoint comprises at least one item of information, namely a request for torque that the engine or the braking system has to provide in order to adjust the speed of the vehicle.

In this case, it will be considered that it comprises three components, namely a torque request $C_B$, a torque order $O_B$ and a state $E_B$ of the ACC function.

The torque request $C_B$ represents the torque, in N·m (Newton meters), to be exerted on the wheels of the vehicle in order to adjust its speed.

The torque order $O_B$ is a binary indicator the value of which indicates whether or not the engine and the braking means should exert a torque.

Finally, the state $E_B$ indicates the current situation of the ACC function. This may adopt various values, for example in this case the values "on", "off", "adjust", "awaiting pressing of a button" and "faulty".

The value "on" corresponds to a state in which the ACC function is ready to start, but is not activated.

The value "off" corresponds to a state in which the ACC function is deactivated.

The value "adjust" corresponds to a state in which the ACC function is activated and controls the speed of the vehicle.

The value "awaiting pressing of a button" corresponds to a state in which the ACC function is waiting for the driver to press a button to continue to control the speed of the vehicle.

The value "faulty" corresponds to a state in which a problem has been detected with the operation of the ACC function, and so it is deactivated.

The ACC software 10 proves to be particularly complex to write. In the context of the invention, provision is therefore made to isolate, in whole ACC function, the one or more functionalities needing to be certified to level ASIL-B.

In this case, the first functionality makes it possible to prevent the vehicle from accelerating beyond a defined threshold, resulting from a standard or from professional knowledge. In other words, this functionality consists in blocking any engine torque request when the vehicle is in an excess acceleration situation.

The second functionality aims to guarantee comfort for the passengers of the vehicle during phases of activating and deactivating the first functionality. In other words, it consists in avoiding a situation where compliance with the above-mentioned threshold produces any discomfort for the driver (shaking, jolts following the blocking of the engine torque requests).

The third functionality makes it possible to check that the information given out by the ACC function does not contain any inconsistencies. Typically, this functionality makes it possible to check that, when the torque request is non-zero, the torque order is non-zero as well. It also makes it possible to check that, when the driver presses a button requesting to stop the ACC function (typically on the brake pedal), the torque request is zero.

Checking that these three functionalities have the desired ASIL level makes it possible to ensure that, even in the event of a fault, the ACC function operates in full safety.

According to the invention, these three functionalities, and these alone, are coded in the safety component 200. On the contrary, all other functionalities of the ACC function are coded in another software block, hereinafter called ACC component 100.

Since the ACC component 100 is well known to those skilled in the art, it will not be described here. It will be stated only that it is programmed, on the basis of the abovementioned input data $D1_{QM}$, $D1_B$, to create at least one preliminary control setpoint.

This preliminary control setpoint comprises three items of information, namely a preliminary torque request $C_{QM}$, a preliminary torque order $O_{QM}$, and a preliminary state $E_{QM}$ of the ACC function. These three items of information are computed taking into account the input data, so as to be as reliable as possible.

However, these three items of information are classified as QM since the ACC component 100 is not ASIL-B-certified.

The safety component 200 is then designed to validate these items of information, or to modify them, so as to be able to transmit ASIL-B-certified information (namely the torque request $C_B$, the torque order $O_B$ and the state $E_B$ of the ACC function).

Since the safety component 200 comprises far fewer lines of code than the ACC component 100, it is able to be ASIL-B-certified more easily.

The safety component 200 receives, at input, the preliminary torque request $C_{QM}$, the preliminary torque order $O_{QM}$, and the preliminary state $E_{QM}$, all from the ACC component 100. It also receives check data $D1_B$.

These check data $D1_B$ are chosen from among the input data such that they all have an ASIL-B-certified safety level. In this way, the safety component 200 does not process input data $D1_{QM}$ having a lower safety level.

As shown by [FIG. 2], the safety block 200 processes the check data $D1_B$ in three sub-blocks 201, 202, 203 that are associated with the three functionalities and that are capable of detecting an excess acceleration, the driver pressing on a means for deactivating the ACC function, and an internal fault, respectively.

Each sub-block is thus able to provide an item of problem detection information $I_{201}$, $I_{202}$, $I_{203}$, which takes the value "0" for as long as no problem is detected, and the value "1" otherwise.

These items of problem detection information $I_{201}$, $I_{202}$, $I_{203}$ are transmitted, in the same way as the abovementioned three items of information (preliminary torque request $C_{QM}$, preliminary torque order $O_{QM}$, and preliminary state $E_{QM}$), to a fourth sub-block 204.

Figure 3:
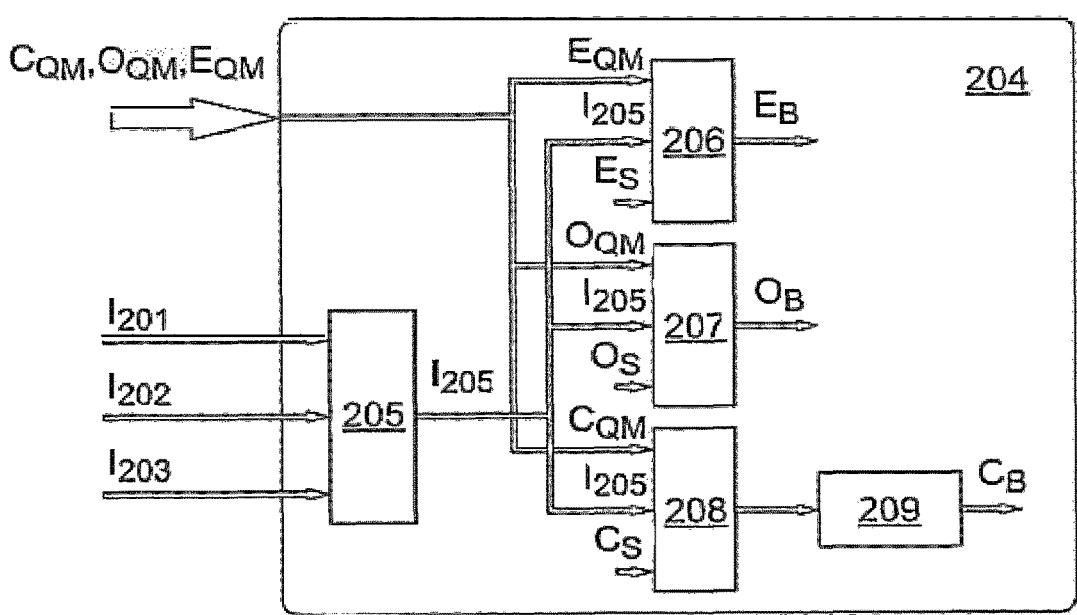
FIG. 3 is a detailed view of a block of the software from FIG. 2.

This fourth sub-block 204 is illustrated in detail in [FIG. 3].

It is observed therein that it comprises a comparator 205, three filters 206, 207, 208, and a transition management unit 209.

The comparator 205 receives the problem detection information $I_{201}$, $I_{202}$, $I_{203}$ at input. It is thus designed to detect whether of the first and third functionalities is not complied with.

In practice, this involves a component that makes it possible to determine the maximum out of the three items of detection information $I_{201}$, $I_{202}$, $I_{203}$. It is therefore designed to provide a datum $I_{205}$ that takes the value "0" for as long as no problem is detected, and the value "1" otherwise.

This datum is transmitted to each of the filters 206, 207, 208.

These filters will make it possible to filter the preliminary torque request $C_{QM}$, the preliminary torque order $O_{QM}$, and the preliminary state $E_{QM}$ of the ACC function, and to certify them to safety level ASIL-B.

For this purpose, in the absence of a problem ($I_{205}=0$), the three filters respectively consider that:

the torque request $C_B$ is equal to the preliminary torque request $C_{QM}$, the torque order $O_B$ is equal to the preliminary torque order $O_{QM}$, and the state $E_B$ of the safe ACC function is equal to the preliminary state $E_{QM}$.

On the contrary, in the event of a problem ($I_{205}=1$), the three filters respectively consider that:

the torque request $C_B$ is equal to a predefined safety torque request $C_S$, the torque order $O_B$ is equal to a predefined safety torque order $O_S$, and the state $E_B$ of the safe ACC function is equal to a predefined safety state $E_S$.

In other words, in the event of a problem, provision is made not to take into account preliminary setpoints for controlling the actuators, but provision is made instead to assign safety values to the data transmitted to these actuators. These safety values are stored in the memory of the computer.

By way of example, the safety torque request may be chosen to be equal to 0 N·m. The safety torque order may be chosen to be equal to 0 (no braking torque or engine torque). The safety state of the ACC function may be considered "faulty".

When a problem occurs (at the time when $I_{205}$ changes from 0 to 1), the torque request $C_B$, torque order $O_B$ and state $E_B$ are modified immediately to prevent the ACC function remaining active and continuing to adjust the speed of the vehicle.

When the problem disappears (at the time when $I_{205}$ changes from 1 to 0), the torque order $O_B$ and state $E_B$ may be modified suddenly.

On the contrary, preferably, the torque request $C_B$ is instead modified so as to vary continuously. For this purpose, the transition management unit 209 is designed to ensure a smoother transition of the torque, which will not vary suddenly so as to ensure better comfort for the passengers.

To sum up, the safety component 200 makes it possible to safeguard the ACC function regardless of the driving conditions, by safeguarding not the entire function to level ASIL-B, but only part of said function.

Since the solution has therefore been identified and coded, it has to be tested on a set of scenarios in order to check the correct operation thereof.

These scenarios make it possible in particular to check that, in the event of excess acceleration, while the preliminary torque setpoint $C_{QM}$ remains at a high value, the filtered torque setpoint $C_B$ is indeed reduced, in this case to throughout 0 N·m, the excess acceleration.

To reduce the number of scenarios to be considered, it is possible to check the correct operation of the ACC function for a very small excess acceleration and for a very large excess acceleration (this representing two extreme cases).

Other scenarios are also contemplated, for example for cases of inconsistencies between the input data, and cases where the driver presses a button to disconnect the ACC function.

LCA Function

A second exemplary application of the invention illustrated in [FIG. 4] may now be focused on.

In this second example, the function in question is the LCA function for keeping the vehicle in the center of its traffic lane.

This function makes it possible to automatically control the steering of the vehicle such that said vehicle remains centered in its traffic lane, as long as the driver remains focused on the road.

This function is coded in a piece of software (hereinafter called LCA software 20) and is executed in hardware terms by a single computer, although, as a variant, a plurality of computers could be used.

This LCA software 20 comprises a plurality of modules, including a module for computing the path of the vehicle, and a module for monitoring the attention of the driver (hereinafter called HOD module).

The path computing module makes it possible to determine a steering angle setpoint to be applied to the steered wheels, and then to deduce therefrom a steering torque setpoint to be sent to the power steering actuator.

This torque steering setpoint is however modulated, at least so as to take into account the wishes of the driver. Thus, if the driver exerts a torque in the opposite direction to that computed by the LCA function on the steering wheel, provision is made to gradually reduce the torque exerted by the actuator so as not to go against the wishes expressed by the driver. In practice, the computed torque setpoint is multiplied by a gain K1, the value of which is between 0 and 100% and makes it possible to take these wishes into account.

The computed torque setpoint may thus differ from the actual torque setpoint (the one received by the power steering actuator). In the same way, the computed steering angle setpoint may differ from the actual steering angle of the wheels.

For its part, the HOD module is programmed to detect whether the driver actually has their hands on their steering wheel 3 and then, if this is not the case, to trigger visual and acoustic warnings that vary depending on the duration that has passed since the last time the driver had their hands on the steering wheel.

More precisely, this HOD module makes it possible to determine a warning level, in this case between 0 and 4, on the basis of which warnings are output for the attention of the driver so as to remind them that they should stay focused on the road.

In this case, this warning level remains equal to 0 for as long as the driver has their hands on the steering wheel, and then increases gradually when the driver has let go of the steering wheel, depending on the time that has passed since the last time they had their hands on the steering wheel.

By way of example, a warning level equal to 1 may correspond to the outputting of a visual warning on the display screen, a warning level equal to 2 may correspond to a combination of visual and acoustic warnings output by the loudspeakers, and a warning level equal to 3 may correspond to a combination of visual, acoustic and haptic warnings (such as jerky braking).

Of course, it only makes sense to compute this warning level when the LCA function is activated. Moreover, this warning level should be considered only if the speed of the vehicle is greater than a threshold, in this case non-zero (for example equal to 5 km/h).

To sum up, the HOD module is implemented using input data relating to the motor vehicle 1 (speed, LCA function active or not) and to the driver (do they have their hands on the steering wheel?), and makes it possible to provide, at output, at least one control setpoint for the human-machine interface in order to generate a warning or a combination of warnings.

This control setpoint will hereinafter be called warning setpoint, and it will in practice be formed by a whole number between 0 and 4 corresponding to the warning level.

In this context, it is desirable for the outputting of the alerts to meet a safety level ASIL-B, in the sense that the steering wheel not being held should always generate the gradual outputting of warnings (in other words, there should not be any false positives).

In this case, as will become clearly apparent in the remainder of this disclosure, it is possible, on the contrary, to tolerate warnings possibly being output unnecessarily (in other words, there may be false negatives).

In this example, the functionality requiring a safety level ASIL-B is therefore the outputting of warnings by the HOD module.

Like in the first exemplary application of the invention, provision is made in this case to divide the LCA function into two blocks (or "software components").

A first block (hereinafter called "LCA component 500") comprises at least the functionality consisting in computing the path of the vehicle. In practice, the LCA component 500 that is used is a standard software component that then makes it possible not only to compute the path of the motor vehicle 1, but also to determine a preliminary warning setpoint $S_{QM}$.

This LCA component 500 is classified as QM, in the same way as the preliminary warning setpoint $S_{QM}$. It receives a wide variety of input signals at input, some of which are classified as QM.

The second block (hereinafter called "safety component 600") is for its part designed to implement only the functionalities that have to be certified to the desired ASIL safety level (in this example level ASIL-B). Therefore, this safety component 600 comprises only the HOD module.

This safety component 600 receives, at input (from the LCA component 500 or from other computers or sensors), the following three check data:

the speed $V_1$ of the motor vehicle 1, the status $S_3$ of hands on the steering wheel (holding or let go), and the state $E_{LCA}$ of the LCA function (for example "active" or "inactive" or "transition" or "error").

In this case, the speed $V_1$ and the status $S_3$ are obtained by way of sensors and software meeting the desired safety level (ASIL-B). On the contrary, the state $E_{LCA}$ does not meet this level and is classified as QM.

Therefore, the safety component 600 is not able to use these three data as a basis for creating a final warning setpoint $S_B$ that meets safety level ASIL-B.

In this case, provision is then made to supplement or replace the state signal $E_{LCA}$ with another datum that indicates, more reliably, whether or not the LCA function is active.

In a first embodiment, this other datum is formed by the difference between the steering angle setpoint and the effective steering angle measured at the wheels. Indeed, this datum makes it possible to determine the extent to which the path of the car corresponds to the path computed by the LCA function.

In a second embodiment that is even more reliable, this other datum relates to the deviation between the steering torque setpoint and the actual steering torque (the one received by the power steering actuator). In practice, this other datum is in this case equal to the abovementioned gain K1.

Then, to compute the warning level, the safety component 600 uses its internal clock and takes the following three data as a basis:

the speed $V_1$ of the motor vehicle 1, the status $S_3$ of hands on the steering wheel (holding or let go), and the gain K1.

Although the gain K1 is not necessarily specified with safety level ASIL-B, the computation thereof, which is simple and which is based on reliable data, ensures that its value is of sufficient reliability.

In this way, a sub-block 601 is able to compute a reliable intermediate warning setpoint $S_{INT}$ on the basis of the three check data.

In order to make this setpoint even more robust so as to obtain the final warning setpoint $S_B$, the safety component 600 comprises a comparator 602 that is designed to monitor consistency between this intermediate warning setpoint $S_{INT}$ and the preliminary warning setpoint $S_{QM}$ computed by the LCA component 500, which, as it will be recalled, is classified as QM.

In practice, the comparator 602, out of these two warning setpoints, retains the one that has the higher value. The safety component 600 is thus able to create a robust final warning setpoint $S_B$.

It should be noted in this case that the clock will make it possible to count the time that has elapsed for which the driver 5 of the motor vehicle 1 has not been focusing on their driving (more specifically in this case since they last had their hands on their steering wheel) not in the form of a decimal number (corresponding to the elapsed time in seconds), but in the form of a whole number corresponding to the number of computing cycles. Indeed, the computer is programmed to operate at a given frequency, meaning that it is possible to count the number of successive times it has been detected that the driver did not have their hands on their steering wheel. Using a whole number in the computing operations (for the LCA function as for the ACC function) advantageously makes it possible to obtain more reliable results. Indeed, a decimal number may have an indefinite number of decimals, which will not all be taken into account in the computing operations, thereby possibly leading to inaccuracies.

FIGS. 5 to 7

FIGS. 5 to 7 illustrate variations over time of multiple parameters, which make it possible to show that the computing of the warning setpoint is actually robust.

In each of these figures, the first graph (at the top) shows the variation of the state $E_{LCA}$ of the LCA function. The second graph shows the evolution of the gain K1. Finally, the last graph (at the bottom) shows the variation of the warning setpoint $S_B$.

These graphs are established so as to meet scenarios for certifying the LCA function at safety level ASIL-B, considering that the driver is not holding the steering wheel.

[FIG. 5] shows a case in which all of the data received by the safety component 600 are reliable.

It is observed therein that, first of all, the LCA function changes successively from a state $E_{LCA}$ "inactive", to "in transition" and then "active" and then "inactive".

At the time when the LCA function is activated, the gain K1 increases gradually to 100%.

At the time when the LCA function is deactivated, the gain K1 decreases gradually to 0%.

By virtue of the comparator 602, it is observed that the warning setpoint $S_B$ increases from the start of the transition from the inactive state to the active state of the LCA function.

Due to the gradual reduction in the gain K1, it is observed that the warning setpoint $S_B$ remains non-zero for a period $\Delta T1$ while it should be equal to zero. This brief error does not create a false positive, but does create a momentary false negative, which has no effect on the safety of the vehicle.

[FIG. 6] shows a case in which the value of the gain K1 is corrupted while the state $E_{LCA}$ is reliable.

It is observed therein that, first of all, the LCA function changes gradually from a state $E_{LCA}$ "inactive", to "in transition" and then "active" and then "error".

At the time when the LCA function is activated, the gain K1 increases gradually to 100% and then, for an unknown reason, it suddenly changes to 0%.

By virtue of the comparator 602, it is observed that the warning setpoint $S_B$ increases from the start of the transition from the inactive state to the active state of the LCA function and remains at a non-zero value for as long as the state $E_{LCA}$ is "active". Therefore, warnings may be output as intended, in spite of the erroneous reduction in the gain K1.

[FIG. 7] shows a case in which the value of the gain K1 is reliable while the other warning setpoint $S_{QM}$ is corrupted (the state $E_{LCA}$ shown is, on the contrary, correct).

It is observed therein that, first of all, the LCA function changes gradually from a state $E_{LCA}$ "inactive", to "in transition" and then "active" and then "error".

At the time when the LCA function is activated, the gain K1 increases gradually to 100% and then changes later to 0%.

While the gain K1 is at 100%, the preliminary warning setpoint $S_{QM}$ (not shown) drops to 0, at a time t1.

By virtue of the comparator 602, it is observed that the warning setpoint $S_B$ increases from the start of the transition from the inactive state to the active state of the LCA function and remains at a non-zero value for as long as the gain K1 is non-zero. Warnings may therefore be output as intended, in spite of the erroneous reduction in the preliminary warning setpoint $S_{QM}$.

The invention claimed is:

1. A driving assistance module for a motor vehicle, comprising:

a main block that receives, at input, a set of input data relating to the motor vehicle and to its environment, and that provides, at output, a preliminary control setpoint for the motor vehicle based on the input data; and a safeguarding block for safeguarding the preliminary control setpoint, which safeguarding block is separate from the main block and receives, at input, the preliminary control setpoint and a set of check data, provides, at output, a final control setpoint and checks that the preliminary control setpoint is in accordance with a set of at least one predefined rule, wherein the set of check data differs from the set of input data, wherein each of the check data has a safety level strictly higher than a safety level of at least one of the input data, and wherein the motor vehicle is controlled according to the final control setpoint.

2. The module as claimed in claim 1, wherein the final control setpoint is equal to the preliminary control setpoint when the preliminary control setpoint is in accordance with the predefined rules and, when not, is equal to a predetermined safety setpoint.

3. The module as claimed in claim 1, wherein the safeguarding block is configured to compute an intermediate control setpoint and wherein the final control setpoint is equal to a maximum out of the preliminary control setpoint and the intermediate control setpoint.

4. The module as claimed in claim 1, wherein:

when, at a first time, the preliminary control setpoint is no longer in accordance with the predefined rules, each component of the final control setpoint varies discontinuously, and when, at a subsequent second time, the preliminary control setpoint is in accordance with the predefined rules again, at least one component of the final control setpoint varies continuously.

5. The module as claimed in claim 1, wherein the check data all have a determined ASIL safety level.

6. The module as claimed in claim 1, wherein at most one of the check data has a safety level lower than that of the check data other than the one of the check data.

7. The module as claimed in claim 1, wherein the final control setpoint comprises a torque to be transmitted to an actuator of a drivetrain or of a braking system so as to carry out a function of automatically adjusting a speed of the motor vehicle.

8. The module as claimed in claim 1, wherein the final control setpoint comprises a warning signal for activating a human-machine interface when a driver of the motor vehicle is no longer focusing on their driving and when a function of keeping the motor vehicle in a center of its traffic lane is activated.

9. The module as claimed in claim 1, wherein the safeguarding block is configured to count time that has elapsed for which a driver of the motor vehicle has no longer been focusing on their driving, in a whole number of cycles.

10. A method for computing a final control setpoint for a motor vehicle equipment, comprising:

receiving, at a main block, a set of input data relating to the motor vehicle and to its environment;

computing, via the main block, a preliminary control setpoint based on the input data;

receiving, at a safeguarding block separate from the main block, the preliminary control setpoint and a set of check data;

computing the final control setpoint, which comprises checking that the preliminary control setpoint is in accordance with a set of at least one predefined rule; and controlling the motor vehicle according to the final control setpoint, wherein the set of check data differs from the set of input data, and wherein the check data has a safety level strictly higher than a safety level of at least one of the input data.

* * * * *